(No Model.)

H. M. AMOS.
FRUIT EVAPORATOR.

No. 556,912. Patented Mar. 24, 1896.

Witnesses:
L. C. Hills
W. S. VanDoan

Inventor:
Harry M. Amos,
by Franklin H. Hough
Atty.

UNITED STATES PATENT OFFICE.

HARRY M. AMOS, OF RAINSBURG, PENNSYLVANIA.

FRUIT-EVAPORATOR.

SPECIFICATION forming part of Letters Patent No. 556,912, dated March 24, 1896.

Application filed August 29, 1895. Serial No. 660,891. (No model.)

*To all whom it may concern:*

Be it known that I, HARRY M. AMOS, a citizen of the United States, residing at Rainsburg, in the county of Bedford and State of Pennsylvania, have invented certain new and useful Improvements in Fruit-Evaporators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in evaporators, and it has more particular reference to that class of evaporators which are specially intended for use in evaporating fruit.

The object of my invention is to provide a simple and inexpensive and yet efficient device of the character indicated in which a series of detachable and interchangeable pans or trays are employed, the several pans being so constructed as to provide for their being readily attached or removed, so as to provide at all times a heat-radiating surface such as may be required.

A further object of the invention resides in the peculiar form of the pans, whereby provision is had for the ready escape of the water of condensation and the return of the same to the lower pan of the series.

To these ends and to such others as the invention may pertain, the same consists in the novel construction and in the peculiar arrangement, combination and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, and in which—

Figure 1:
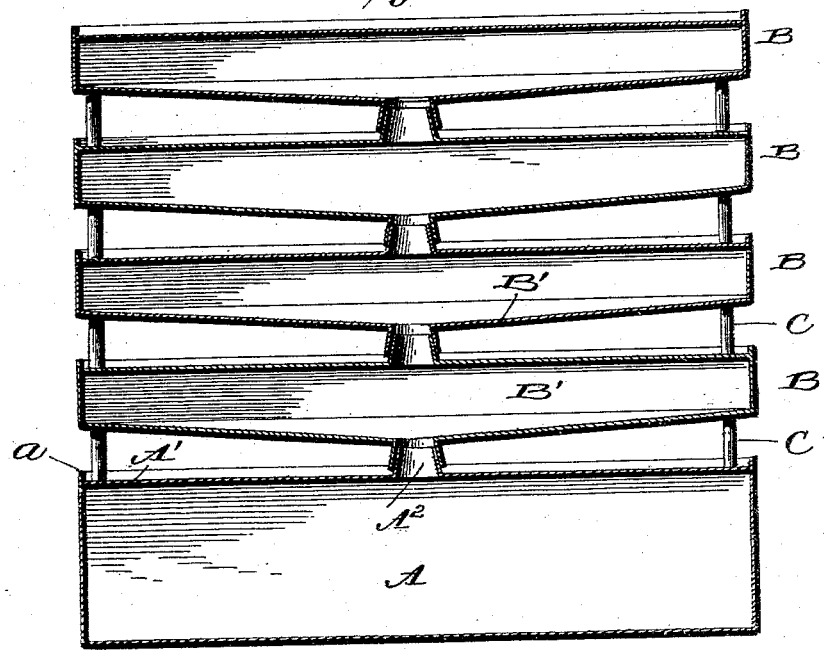
Figure 2:
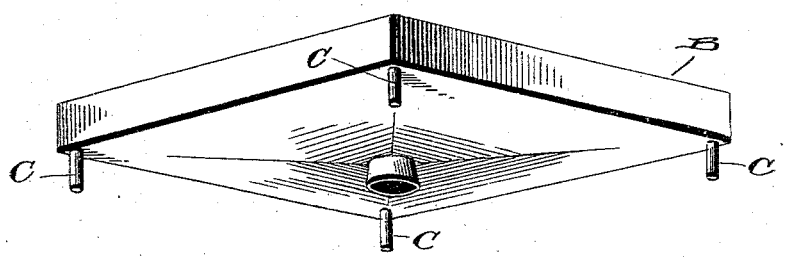
Figure 3:
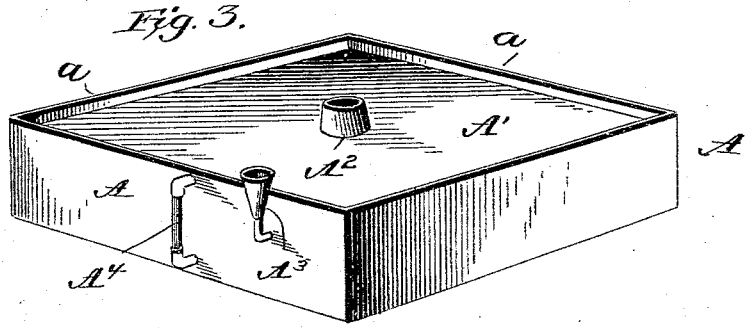

Figure 1 is a longitudinal vertical section through a fruit-evaporating apparatus embodying my improvements. Fig. 2 is a bottom perspective view of one of the pans removed from the series, and Fig. 3 is a perspective view of the bottom pan.

Reference now being had to the details of the drawings by letter, A designates the bottom pan, which is adapted to contain the water from which the steam is generated, said pan or water-receptacle being provided with a closed top A', from the outer edges of which rise the flanged edges $a$, thus providing upon the top of the water-chamber a shallow tray, as shown. From the center of the cover or top A' rises a frusto-conical tube $A^2$, which communicates at its lower end with the interior of the water-compartment. A suitable filling-inlet $A^3$ is provided, whereby water is introduced to the water-compartment, and $A^4$ is a water-gage connected to the water-tank.

A series of shallow pans or trays B B is employed, each of said pans being in every respect similar to the water-receptacle tray just described, excepting that the bottom plate is inclined from the sides to the center, where an opening having a flaring collar to engage the upper end of the tube $A^2$ is provided, thus providing a means whereby water of condensation may be returned to the water-receptacle.

In the accompanying drawings I have shown the several pans as provided with posts C at the corners, which rest upon the corners of the trays next beneath in the series, though this construction is not essential, as the posts can be used or omitted, as desired, or other supporting means may be provided without departing from the spirit of my invention.

It will be understood that it is my purpose to use any number of trays or pans that I may find to be most convenient or desirable, and my invention contemplates the use of either one or more. The pans being detachable and interchangeable permits the ready placing or removal of the trays as desired.

The invention contemplates, further, the construction of the trays of any sheet metal that may be found to be adapted to the purpose, and although I have in the drawings shown the trays as rectangular it is at once evident that they may, if desired, be of other forms, and of course they may be of any suitable or desired size, so as to best adapt them for the work for which they are intended.

Having thus described my invention, what I claim to be new, and desire to secure by Letters Patent, is—

An apparatus for drying fruit consisting of a closed tank A having a central frusto-conical tube $A^2$ surrounding an aperture in the upper wall of said tank, combined with a series of independent, inclosed steam-trays, each tray having a central aperture in its upper and lower walls, frusto-conical tubes secured about each aperture adapted to register with one another when the trays are superimposed, and the legs C, all substantially as shown and described.

In testimony whereof I affix my signature in presence of two witnesses.

HARRY M. AMOS.

Witnesses:
J. F. REED,
JO. W. TATE.